(12) United States Patent
Kim et al.

(10) Patent No.: US 10,440,266 B2
(45) Date of Patent: Oct. 8, 2019

(54) DISPLAY APPARATUS AND METHOD FOR GENERATING CAPTURE IMAGE

(71) Applicant: SAMSUNG ELECTRONICS CO., LTD., Suwon-si (KR)

(72) Inventors: Jung-geun Kim, Suwon-si (KR); Chang-seog Ko, Hwaseong-si (KR); Seok-hyun Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 36 days.

(21) Appl. No.: 15/604,783

(22) Filed: May 25, 2017

(65) Prior Publication Data

US 2018/0103198 A1 Apr. 12, 2018

(30) Foreign Application Priority Data

Oct. 11, 2016 (KR) .................. 10-2016-0131357

(51) Int. Cl.
| | |
|---|---|
| *H04N 13/354* | (2018.01) |
| *G06T 19/00* | (2011.01) |
| *H04N 21/40* | (2011.01) |
| *H04N 5/232* | (2006.01) |

(52) U.S. Cl.
CPC ......... *H04N 5/23238* (2013.01); *G06T 19/00* (2013.01); *H04N 13/354* (2018.05); *H04N 21/40* (2013.01); *H04N 5/23245* (2013.01)

(58) Field of Classification Search
None
See application file for complete search history.

(56) References Cited

U.S. PATENT DOCUMENTS

| | | | |
|---|---|---|---|
| 6,563,529 B1 | 5/2003 | Jongerius | |
| 7,206,017 B1 | 4/2007 | Suzuki | |
| 2004/0006425 A1* | 1/2004 | Wood | G01C 21/26 701/532 |
| 2004/0096188 A1* | 5/2004 | Kageyama | G11B 27/034 386/255 |
| 2004/0264919 A1* | 12/2004 | Taylor | G11B 27/034 386/223 |

(Continued)

FOREIGN PATENT DOCUMENTS

| | | |
|---|---|---|
| KR | 10-2013-0024357 A | 3/2013 |
| KR | 10-2015-0012102 A | 2/2015 |

(Continued)

OTHER PUBLICATIONS

Communication issued by the International Search Authority dated Oct. 19, 2017 in counterpart International Application No. PCT/KR2017/006788 (PCT/ISA/210 & PCT/ISA/237).

(Continued)

*Primary Examiner* — Reza Aghevli
(74) *Attorney, Agent, or Firm* — Sughrue Mion, PLLC

(57) ABSTRACT

A display device is disclosed. The display device includes a display configured to display an image corresponding to a currently displayed viewpoint of a plurality of viewpoints in a panoramic image, a processor configured to generate a capture image having a plurality of capture image viewpoints corresponding to a current display frame of the panoramic image in response to receiving a capture command, and a storage configured to store the capture image.

24 Claims, 11 Drawing Sheets

(56) References Cited

U.S. PATENT DOCUMENTS

| | | | |
|---|---|---|---|
| 2007/0139529 A1* | 6/2007 | Levien | G06T 1/00 348/220.1 |
| 2007/0182812 A1* | 8/2007 | Ritchey | H04N 5/2254 348/36 |
| 2007/0236514 A1* | 10/2007 | Agusanto | A61B 1/00193 345/646 |
| 2007/0285549 A1* | 12/2007 | Takano | B60R 1/00 348/333.01 |
| 2010/0251101 A1 | 9/2010 | Haussecker et al. | |
| 2013/0141523 A1 | 6/2013 | Banta et al. | |
| 2013/0169765 A1* | 7/2013 | Park | H04N 7/142 348/54 |
| 2013/0176389 A1* | 7/2013 | Chen | H04N 19/597 348/43 |
| 2014/0324626 A1* | 10/2014 | Klink | G06Q 30/0631 705/26.8 |
| 2015/0033150 A1 | 1/2015 | Lee et al. | |
| 2015/0213577 A1* | 7/2015 | Filip | H04N 5/23238 345/671 |
| 2015/0304559 A1 | 10/2015 | Glasse | |
| 2015/0326783 A1 | 11/2015 | Kroepfl et al. | |
| 2016/0080647 A1* | 3/2016 | Kimura | H04N 1/3876 348/36 |
| 2016/0086386 A1 | 3/2016 | Son et al. | |
| 2016/0191798 A1 | 6/2016 | Yoo et al. | |
| 2016/0246061 A1* | 8/2016 | Bickerstaff | G06F 3/012 |
| 2018/0068639 A1* | 3/2018 | Kim | G06F 3/04815 |

FOREIGN PATENT DOCUMENTS

| | | |
|---|---|---|
| KR | 10-2015-0044474 A | 4/2015 |
| KR | 10-2015-0129933 A | 11/2015 |
| KR | 10-2016-0034037 A | 3/2016 |
| WO | 2016/033452 A1 | 3/2016 |

OTHER PUBLICATIONS

Communication dated May 24, 2019, issued by the European Patent Office in counterpart European Application No. 17860954.1.

* cited by examiner

DISPLAY APPARATUS AND METHOD FOR GENERATING CAPTURE IMAGE

CROSS-REFERENCE TO RELATED APPLICATION

This application claims priority from Korean Patent Application No. 10-2016-0131357, filed in the Korean Intellectual Property Office on Oct. 11, 2016, the disclosure of which is incorporated herein by reference in its entirety.

BACKGROUND

1. Field

Devices and methods consistent with exemplary embodiments relate to a display apparatus and a method for generating a capture image, and more particularly, to a display device which can generate a capture image having a plurality of viewpoints regarding a panoramic image and a method for generating a capture image.

2. Related Art

A display apparatus processes digital or analog video signals, and generates an image based on these processed signals. The digital or analog signals may be received from an external source or stored in an internal storage device as compressed files. Digital or analog video signals that are received from an external source may be broadcasting signals, digital satellite broadcasting signals, signals transmitted by various kinds of external devices (e.g., a set-top box, a disk player, a mobile device, and a PC), or signals received from a server using an Internet protocol.

Recently, display apparatuses capable of reproducing a panoramic image which can be displayed in a plurality of viewpoints in addition to a general image having a single viewpoint, have been developed.

A user may capture a desired screen while watching such a panoramic image but existing display apparatuses merely capture a screen which is displayed on the screen.

SUMMARY

Therefore, it is inconvenient for a user to obtain a capture image having various viewpoints or capture images having various viewpoints because the user has to repetitively input a viewpoint change command several times and a capture command at each of the changed viewpoints.

Exemplary embodiments are related to a display apparatus which can generate a capture image having a plurality of viewpoints with respect to a panoramic image and a method for generating a capture image.

According to an aspect of an exemplary embodiment, there is provided a display device including: a display configured to display an image corresponding to a currently displayed viewpoint of a plurality of viewpoints in a panoramic image; a processor configured to generate a capture image having a plurality of capture image viewpoints corresponding to a current display frame of the panoramic image in response to receiving a capture command; and a storage configured to store the capture image.

The processor may be further configured to include each of the plurality of viewpoints of the current display frame of the panoramic image in a single capture image.

The processor may be further configured to generate the single capture image based on the currently displayed viewpoint.

The processor may be further configured to generate information regarding the currently displayed viewpoint as metadata and associate the metadata with the single capture image.

The capture image may be one of a plurality of capture images, and the processor may be further configured to generate the plurality of capture images respectively corresponding to the plurality of viewpoints of the current display frame of the panoramic image.

The plurality of capture images may include a first capture image having a first capture image viewpoint rotated by 0 degrees with respect to the currently displayed viewpoint, a second capture image having a second capture image viewpoint rotated by 90 degrees with respect to the currently displayed viewpoint, a third capture image having a third capture image viewpoint rotated by 180 degrees with respect to the currently displayed viewpoint and a fourth capture image having a fourth capture image viewpoint rotated by 270 degrees with respect to the currently displayed viewpoint.

The display device may further include a manipulator configured to receive the capture command and a selection of an object in the panoramic image.

The processor may be further configured to detect whether the selected object is currently displayed, and to repeatedly capture images in response to the selected object being detected while the panoramic image is reproduced.

The processor may be further configured to generate the capture image having the plurality of viewpoints based on the selected object.

The processor may be further configured to control the display to display an area of a pre-stored capture image corresponding to a previously displayed viewpoint of the panoramic image corresponding to a time the capture command was received in response to receiving a display command with respect to the pre-stored capture image corresponding to the previously displayed viewpoint The panoramic image may include viewpoints of 360 degrees.

According to an aspect of another exemplary embodiment, there is provided a method for generating a capture image, the method including: displaying an image corresponding to a currently displayed viewpoint of a plurality of viewpoints in a panoramic image; receiving a capture command; generating a capture image having a plurality of capture image viewpoints corresponding to a current display frame of the panoramic image; and storing the generated capture image.

The generating may include each of the plurality of viewpoints of the current display frame of the panoramic image in a single capture image.

The generating may be based on the currently displayed viewpoint.

The generating may include: generating information regarding the currently displayed viewpoint as metadata; and associating the metadata with the single capture image.

The capture image may be one of a plurality of capture images, and the generating may include generating the plurality of capture images respectively corresponding to the plurality of viewpoints of the current display frame of the panoramic image.

The plurality of capture images may include a first capture image having a first capture image viewpoint rotated by 0 degrees with respect to the currently displayed viewpoint, a second capture image having a second capture image viewpoint 90 degrees with respect to the currently displayed viewpoint, a third capture image having a third capture image viewpoint 180 degrees with respect to the currently displayed viewpoint and a fourth capture image having a fourth capture image viewpoint 270 degrees with respect to the currently displayed viewpoint.

The method may further include receiving a selection of an object in the panoramic image, and the generating may include: detecting whether the selected object is currently displayed; and repeatedly generating capture images, in response to the selected object being detected while the panoramic image is reproduced.

The method may further include receiving a selection of an object in the panoramic image, and the generating the capture image having the plurality of viewpoints may be based on the selected object.

According to an aspect of yet another exemplary embodiment, there is provided a non-transitory computer readable recording medium including a program, which when executed by a processor a display device, causes the display device to execute a method of generating a capture image, the method including: displaying an image corresponding to a currently displayed viewpoint of a plurality of viewpoints in a panoramic image; receiving a capture command; generating a capture image having a plurality of capture image viewpoints corresponding to a current display frame of the panoramic image; and storing the generated capture image.

According to an aspect to still yet another exemplary embodiment, there is provided a device configured to generate a capture image, the device including: a display configured to display an image corresponding to a currently displayed viewpoint of a plurality of viewpoints in a panoramic image; and a processor configured to determine a capture image operating mode and generate a capture image based on a current display frame of the panoramic image in response to receiving a capture command.

The capture image operating mode may be selected from among a first capture image operating mode, a second capture image operating mode and a third capture image operating mode, and the processor may be further configured to capture only the currently displayed viewpoint as the capture image while operating in the first capture image operating mode, capture each of the plurality of viewpoints as the capture image while operating in the second capture image operating mode, and capture a first viewpoint of the plurality of viewpoints and a second viewpoint of the plurality of viewpoints as the capture image while operating in the third capture image operating mode.

The processor may be further configured to control the display to indicate one among the first capture image operating mode, the second capture image operating mode and the third capture image operating mode a current operating mode.

The panoramic image may be one of a plurality of sequentially displayed panoramic images, and the processor may be further configured to receive an object selection indicating a selected object, determine whether the selected object is displayed in a currently displayed panoramic image of the plurality of sequentially displayed panoramic images, and generate a capture image for each panoramic image of the plurality of sequentially displayed panoramic images determined to include the selected object.

DETAILED DESCRIPTION OF EXEMPLARY EMBODIMENTS

Hereinafter, terms used in exemplary embodiments will be briefly explained, and exemplary embodiments will be described in greater detail with reference to the accompanying drawings.

Although the terms used in the exemplary embodiments may be general terms, which are widely used in the present time considering the functions in the present disclosure, the terms may be changed depending on an intention of a person skilled in the art, a precedent, and introduction of new technology. In addition, in a special case, terms selected by the applicant may be used. In this case, the meaning of the terms will be explained in detail in the corresponding detailed descriptions. Accordingly, the terms used in the description should not necessarily be construed as simple names of the terms, but be defined with respect to meanings of the terms and overall contents of the present disclosure.

Various example embodiments will be described with reference to accompanying drawings. However, an exemplary embodiment may be embodied in many different forms, and various modifications, equivalents and replacements included in the disclosed concept and technical scope of this specification may be employed. In describing exemplary embodiments, well-known functions or constructions are not described in detail to avoid obscuring the specification with unnecessary detail.

Terms such as "first," "second," and so on may be used to describe a variety of elements, but the elements should not be limited by these terms. The terms are used only for the purpose of distinguishing one element from another.

A singular expression includes a plural expression, unless otherwise specified. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

In an example embodiment, "a module" or "a unit" performs at least one function or operation, and may be realized as hardware (e.g., circuitry), firmware, software, or combination thereof. In addition, a plurality of "modules" or a plurality of "units" may be integrated into at least one module and may be realized as at least one processor.

Hereinafter, exemplary embodiments will be described in detail with reference to accompanying drawings.

Figure 1:
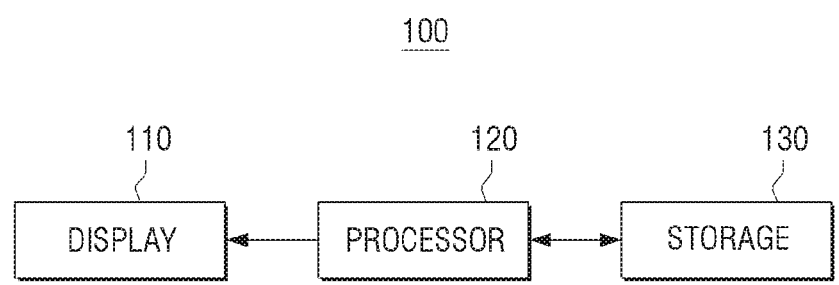
FIG. 1 is a block diagram illustrating configuration of a display apparatus according to an exemplary embodiment.

FIG. 1 is a block diagram illustrating configuration of a display apparatus according to an exemplary embodiment.

FIG. 1 illustrates that a display apparatus 100 includes a display 110, a processor 120 and a storage 130. Herein, the display apparatus 100 is a device which displays an image, and may be a television (TV), a monitor, a tablet PC, a laptop PC, a desktop PC, a projector, a smartphone, a wearable device, etc.

The display 110 displays an image. For example, the display 110 may be implemented as a Liquid Crystal Display (LCD), a Cathode-Ray Tube (CRT), a Plasma Display Panel (PDP), an Organic Light Emitting Diode (OLED) display, or a Transparent OLED (TOLED) display, or the like.

Also, the display 110 may be implemented as a touch screen type capable of sensing a touch manipulation of a user. In other words, the display 110 may be embodied as a single device with a manipulator 195 which will be described hereinafter.

In addition to displaying a general image having a single viewpoint, the display 110 may display a panoramic image having a plurality of viewpoints. For example, the panoramic image may be an image which is generated by combining a plurality of images which are photographed by moving a single camera, an image which is generated by combining a plurality of images photographed by multiple cameras in different viewpoints at the same place or an image which is photographed with one camera which has wide angle of view.

The panoramic image is not limited to an image photographed by a camera. For example, the panoramic image may be an artificially produced content such as a game image. Additionally, an image includes both a still image and a video.

A panoramic image may have viewpoints of 360 degrees. The panoramic image having viewpoints of 360 degrees indicates an image of which a starting part is identical to an ending part, and may be referred to by various names such as a spherical image, an omni-directional image, etc. According to the disclosure, the panoramic image having viewpoints of 360 degrees may be appreciated in various modes. For example, the display 110 may display a plurality of images having different viewpoints in addition to an image corresponding to a default viewpoint or a viewpoint which is selected. For example, the display 110 may display an image corresponding to a first viewpoint on a first area and display an image of which a viewpoint is rotated by 180 degrees from the first viewpoint on a second area which is below the first area. Alternatively, the display 110 may display images of four viewpoints at the same time in addition to images of two viewpoints.

The display 110 may display a menu user interface (UI) for receiving a user control command. Specifically, the display 110 may display a UI for receiving a capture command and a UI for receiving a capturing method from a user. Herein, the UI for receiving a capturing method may be a UI for selecting one among a first capturing method by which only a currently displayed screen is captured, a second capturing method by which the entire image of a current display frame is captured as a single capture image and a third capturing method by which a plurality of capture images having different viewpoints of the current display frame are captured. Also, one of the capturing methods may be pre-set as a default.

The display 110 may display a UI for displaying information regarding a viewpoint of which image is currently displayed in a panoramic image. Such UI for displaying the information regarding a viewpoint may be displayed temporarily only when there is a manipulation, and may no longer be displayed after a predetermined time has elapsed after the manipulation.

When the capture operation is performed, the display 110 may display a message which indicates that the capture is performed. In addition to a message, various image effects to indicate that a capture is performed may be displayed. For example, a screen may be brightened for a predetermined period of time or a level of transparency of a captured image may gradually decrease after the captured image being displayed.

The display 110 may display a captured image. Herein, the display 110 may display a captured image on an area for a predetermined period of time together with the currently displayed screen.

The display 110 may display a list of the capture images stored in the storage 130. Herein, the display 110 may display respective thumbnails corresponding to capture images stored in the storage 130 and display the capture image corresponding to a selected thumbnail.

If the capture image that the user selected is a panoramic image having a plurality of viewpoints, the display 110 may display an area corresponding to a viewpoint at a time of capturing the capture image in the panoramic image.

If the capture image selected by the user is one of a plurality of capture images having different viewpoints, the display 110 may display the plurality of capture images which are generated together with the capture image selected by the user. Herein, the display 110 may display the capture image which is selected by the user on a main area, or display another capture image of a different angle on an area which is smaller than the main area, together with the capture image selected by the user.

If the capture image selected by the user is a capture image which is generated by the user selecting an object, the display 110 may display a different capture image which is captured at a different time together with the currently selected capture image or may display information indicating that there is a capture image which is captured at a different time.

A processor 120 controls overall operations of the display apparatus 100. The processor 120 may include a bus which connects a central processing unit (CPU), a random-access memory (RAM), a read-only memory (ROM), etc. Meanwhile, the processor 120 may be implemented as one CPU, but may also be implemented as a plurality of CPUs. The processor 120 may be embodied as a micro computer (MICOM), an application specific integrated circuit (ASIC), etc.

The processor 120 may control the display 110 to display an image. Specifically, the processor 120 may, in response to an image signal being received from a broadcast receiver 140 or a communication interface 190 which are described hereinafter, control the display 110 to display an image corresponding to the received image signal.

The processor 120 may, in response to an input of a command to reproduce the content stored in the storage 130, control the display 110 to display an image corresponding to the content stored in the storage 130. Herein, the content may be a general image content as described above or a panoramic image content.

In response to an input of a command to reproduce a panoramic image, the processor 120 may control the display 110 to display an image corresponding to a viewpoint corresponding to a user manipulation in the panoramic image or an image corresponding to a predetermined default viewpoint in the panoramic image.

When a capture command is input while an image is reproduced, the processor 120 may generate a capture image by using a current display frame of a panoramic image. The generated capture image may be stored in the storage 130 by the processor 120.

Herein, the processor 120 may control the display 110 to display a UI for receiving a selection of a capturing method corresponding to the capture command. The processor 120 may perform a capture according to the selected capturing method. Therein, the capturing method may be a first capturing method for generating a single capture image corresponding to the currently displayed screen, a second capturing method for generating a capture image having a plurality of viewpoints or a third capturing method for generating a plurality of capture images having different viewpoints. Meanwhile, when a capture is performed by the third capturing method, the processor 120 may receive a viewpoint to be captured which is designated by an input or a viewpoint which is changed by an input.

When a capture is performed using the first capturing method, the processor 120 may generate a single capture image of the currently displayed screen.

Figure 6:
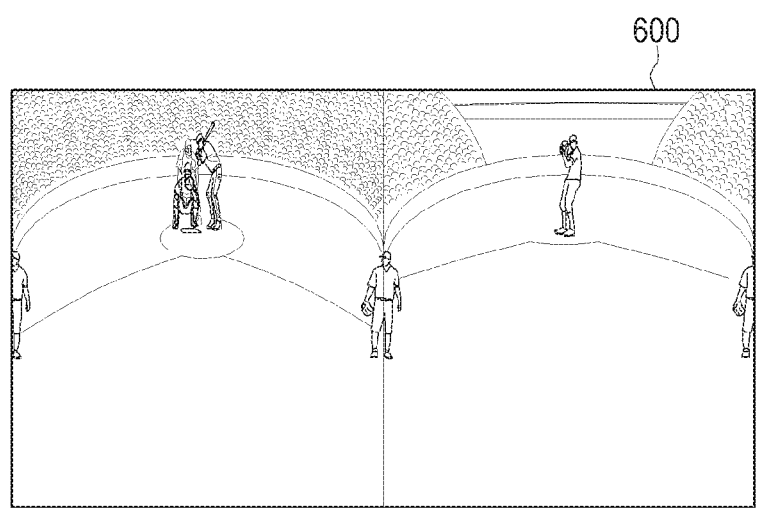
FIG. 6 is a view illustrating a capture image generated in a second capturing method according to an exemplary embodiment.

When a capture is performed using the second capturing method, the processor 120 may generate a capture image having a plurality of viewpoints, as shown in FIG. 6, corresponding to a panoramic image having viewpoints of 360 degrees. Herein, the processor 120 may add information regarding the currently displayed viewpoint to the metadata with respect to the capture image.

When a capture is performed using the third capturing method, the processor 130 may generate a plurality of capture images having different viewpoints. Herein, the processor 130 may add viewpoint information of each of the plurality of capture images having different viewpoints into the metadata and add an identifier notifying that the plurality of capture images are generated together into the metadata or a name of a file.

When a certain object is selected in the currently displayed image, the processor 120 may generate a capture image for each frame on which the selected object is displayed.

The processor 120 also may generate capture images in which the selected object is disposed at various degrees. For example, if the selected object is disposed at the center of the displayed screen with a viewpoint of 0 degrees, the processor 120 may generate a capture image of which viewpoint is rotated 0 degrees and in which the current object is located at the center, a capture image of which viewpoint is rotated by 15 degrees and in which the selected object is disposed on the right side and a capture image of which viewpoint is rotated by 345 degrees and in which the selected object is disposed on the left side. Herein, 0 degrees, 15 degrees and 345 degrees are only example figures. In addition to the above-described figures, a capture image of which viewpoint is rotated by a certain degree other than the described degrees and two capture images or more than four capture images may be generated.

Herein, the processor 120 may identify a plurality of objects other than the selected object and may generate a plurality of capture images in which the identified objects and the selected object are variously disposed. Herein, the processor 120 may control the display 110 to display the generated plurality of capture images and a selected capture image may be stored in the storage 130. A capture image which is generated without a selection may also be stored in the storage 130.

The display apparatus 100 may operate a game content and display an image corresponding to the game content. While the image corresponding to the game content is displayed, in response to a certain object being selected, the processor 120 may generate a capture image having a plurality of viewpoints based on the selected object. Specifically, the processor 120 may render an image having a plurality of viewpoints with respect to the selected object and generate a capture image having the plurality of viewpoints with respect to the rendered image. Examples regarding this will be described with reference to FIG. 9 hereinafter.

When the capture image is generated, the processor 120 may control the display 110 to display a UI indicating that the capture image is generated. Herein, an audio output interface 170 which will be described later may be controlled to output sound which indicates the capture together with the UI display.

When the capture image is generated, the processor 120 may display the capture image or display a thumbnail corresponding to the capture image together with the currently displayed image.

When a command to display a capture image is received, the processor 120 may control the display 110 to display the capture image which is stored in the storage 130. Herein, the processor may control the display 110 to display an area corresponding to the viewpoint at the time of capturing the capture image.

The storage 130 may store image contents. Specifically, the storage 130 may receive and store a video content, in which video and audio are compressed, from the A/V processor 160, and may output the stored video content to the A/V processor 160 under the control of the processor 120. The storage 130 may be implemented by a hard disk, a nonvolatile memory, and/or a volatile memory.

The storage 130 may store a capture image which is generated through the above-described process.

Hereinabove, the brief elements of the display apparatus 100 are described but the display apparatus 100 may include elements illustrated in FIG. 2. The specified configuration of the display apparatus 100 are described hereinafter with reference to FIG. 2.

Figure 2:
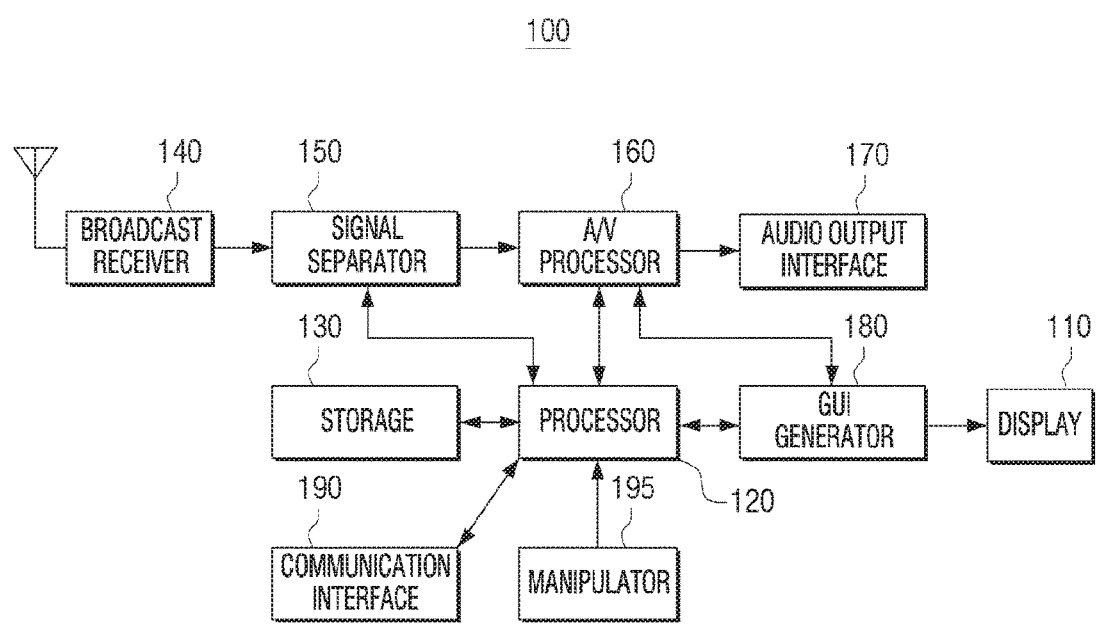
FIG. 2 is a block diagram illustrating a more detailed configuration of a display apparatus according to an exemplary embodiment.

FIG. 2 is a block diagram illustrating a specific configuration of a display apparatus according to an exemplary embodiment.

FIG. 2 illustrates that the display apparatus 100 includes the display 110, the processor 120, the storage 130, the broadcast receiver 140, a signal separator 150, an A/V processor 160, the audio output interface 170, a graphic user interface (GUI) generator 180, a communication interface 190 and manipulator 195.

As functions of the display 110, the processor 120 and the storage 130 illustrated in FIG. 2 are similar to the functions which are described with reference to FIG. 1, repetitive explanations are omitted.

The broadcast receiver 140 may receive a panoramic image via a broadcasting signal in a wired or wireless manner from a broadcasting station or a satellite and demodulate the received broadcasting signal.

The signal separator 150 may separate the broadcasting signal into a video signal, an audio signal, and an additional information signal. Further, the signal separator 150 may transmit the video signal and the audio signal to the A/V processor 160.

The A/V processor 160 performs signal processing, such as video decoding, video scaling, and audio decoding, with respect to the video signal and the audio signal that are transmitted from the broadcast receiver 140, the communication interface 190 and/or the storage 130. The A/V processor 160 outputs an image signal through the GUI generator 180 and outputs an audio signal through the audio output interface 170.

The A/V processor 160 may compress the video and audio signals and store the compressed video and audio signals in the storage 130.

The audio output interface 170 may convert the audio signal that is output from the A/V processor 160 into sound, and may output the sound through a speaker or to an external device connected thereto through an external output terminal.

When a capture image is generated in response to a capture command, the audio output interface 170 may output sound which corresponds to the capturing event (for example, "click" sound).

The GUI generator 180 may generate a GUI to be provided. Further, the GUI generator 180 may add the generated GUI to an image that is output from the A/V processor 160. Further, the GUI generator 180 may provide the image to which the GUI is added, to the display 110.

When a capture image is generated based on a user command to capture, the GUI generator 180 may provide an image including a message which indicates the capture image being generated, on the display 110.

Alternatively, when the capture image is generated based on a user capture command, the GUI generator 180 may provide an image on which a certain effect is applied on the display 110. Herein, the certain effect may be an effect of brightening the screen for a certain period of time (for example, 0.5 seconds), an effect of overlaying the captured image on the current screen or an effect of displaying a thumbnail image corresponding to the captured image on a certain area of the screen.

The communication interface 190 may be connected with an external apparatus such as a set-top box, a personal computer (PC), a laptop PC, a mobile apparatus and/or the like and receive image contents from the external apparatus. Specifically, the communication interface 190 is formed to connect the display apparatus 100 with an external apparatus and support various connection methods to connect to various external apparatuses.

For example, the communication interface 190 may be connected to the terminal device through a local area network (LAN), the internet, a high definition multimedia interface (HDMI) port, a universal serial bus (USB) port, a mobile high-definition link (MHL) port, or a wireless communication (e.g., Wi-Fi 802.11 a/b/g/n, near field communication (NFC) or Bluetooth) port.

The manipulator 195 is to receive a user manipulation command. Specifically, the manipulator 195 may include a touch screen, a touch pad, a key button, a key pad, etc., and receive a user manipulation on the display device 100.

The manipulator 195 may be included in the display apparatus 100 and may include a remote controller signal receiver which receives a control signal corresponding to a user manipulation by an external remote controller. The remote controller signal receiver, for example, may include photodiode for receiving an IR signal which is generated from a remote control device.

The manipulator 195 may receive a selection of a panoramic image to be displayed.

The manipulator 195 may receive a selection of a display viewpoint regarding the panoramic image. For example, when a display viewpoint change is received by a button, the display viewpoint may be changed to a default change angle (for example, 10 degrees) corresponding to a short button selection. In other words, a viewpoint change button is selected to the right side three times, the display apparatus 100 may sequentially display the images of which viewpoints are rotated by 10 degrees, 20 degrees and 30 degrees. Meanwhile, the button is selected for a predetermined time or longer, the display apparatus 100 may sequentially display images of which viewpoints are linearly changed until the button is released.

The manipulator 195 may receive a capture command for a panoramic image which is displayed. Herein, the manipulator 195 may receive a user command to select a capturing method.

The manipulator 195 may receive a user command to select a capture image which is to be stored among a plurality of capture images.

The manipulator 195 may receive a selection of a certain object in the displayed image. Even though it is described that a certain object is directly selected, exemplary embodiments are not limited thereto. A certain object may be selected by the manipulator 195 receiving a command to select certain coordinates in the currently displayed image and analyzing the selected object through the image analysis of the processor 120.

The manipulator 195 may receive a display command regarding a captured image. When a list of a plurality of capture images stored in the storage 130 is displayed corresponding to the command, the manipulator 195 may receive a command to select one of the images in the list.

Even though it is described that a user manipulation is directly input through the display apparatus 100 or a remote controller, exemplary embodiments are not limited thereto, and a user manipulation may be input through an external electronic apparatus. In this case, the communication interface 190 may receive a control signal corresponding to a manipulation command from an electronic apparatus.

As described above, because the display apparatus according to the exemplary embodiments generates a capture image having a plurality of viewpoints when a panoramic image is captured, a user may capture a plurality of images without changing viewpoints on the screen, and this improves user convenience. In addition, the display device may display any image among the images corresponding to all viewpoints of 360 degrees in the panoramic image.

Even though it is explained that the display apparatus 100 displays an image by receiving a broadcast signal, exemplary embodiments are not limited thereto, and a configuration necessary for receiving a broadcast signal such as the broadcast receiver, a signal separator and the like may be omitted. In other words, the display apparatus 100 according to the exemplary embodiments may be an apparatus, such as a monitor, which only displays an image transmitted from an external apparatus in addition to an apparatus, such as a TV, which displays a broadcast signal.

Figure 3:
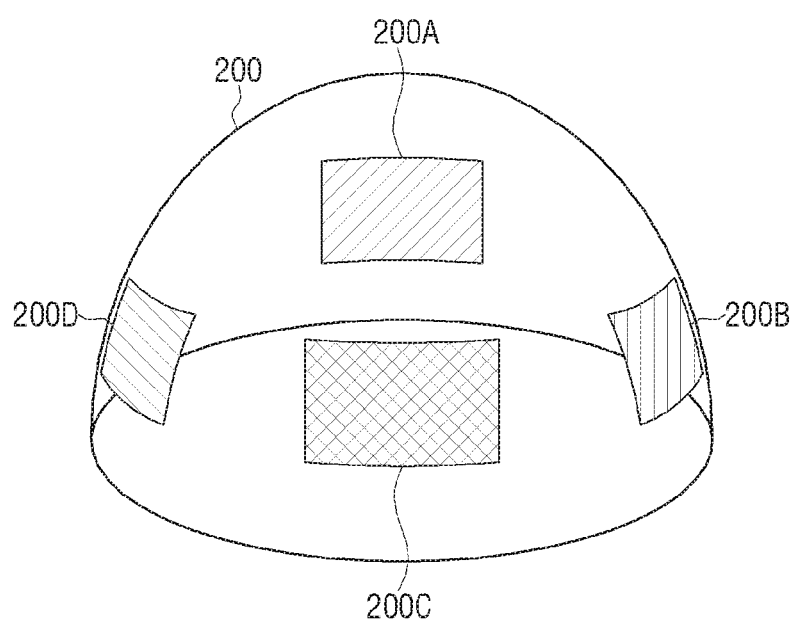
FIG. 3 is a view illustrating various viewpoints in a panoramic image according to an exemplary embodiment.

FIG. 3 is a view illustrating images of various viewpoints in a panoramic image having viewpoints of 360 degrees (a spherical image).

Referring to FIG. 3, the display apparatus 100 may display an image corresponding to a viewpoint in the entire panoramic image 200. For example, as illustrated in FIG. 3, the display apparatus 100 may display a first viewpoint image 200A, a second viewpoint image 200B, a third viewpoint image 200C and/or a fourth viewpoint image 200D.

For example of an actual place, when it is assumed that the panoramic image 200 is photographed on a mound toward a home plate in a ball park, the first viewpoint image 200A is an image of the home plate, the second viewpoint image 200B is an image of the third base, the third viewpoint image 200C is an image of the second base and the fourth viewpoint image 200D is an image of the first base.

Even though it is illustrated that the panoramic image having viewpoints of 360 degrees is spherical, exemplary embodiments are not limited thereto, and an actual panoramic image of 360 degrees may be spherical.

Figure 4:
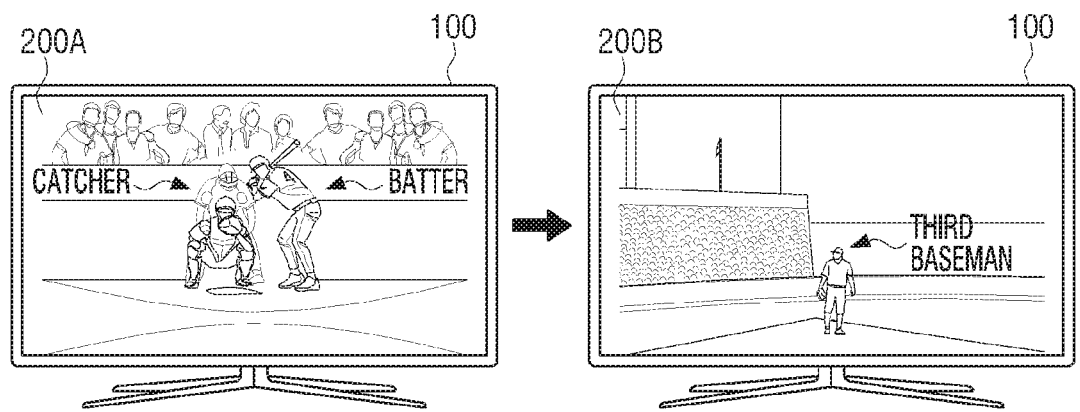
FIG. 4 is a view illustrating display of a panoramic image in a display apparatus according to an exemplary embodiment.

FIG. 4 is a view illustrating examples of displaying a panoramic image in a display apparatus. Specifically, FIG. 4 illustrates moving a viewpoint when the display apparatus 200 receives a command changing to the second viewpoint image 200B from the first viewpoint image 200A in the panoramic image 200.

Referring to FIGS. 3 and 4, in the state that the display apparatus 100 displays the first viewpoint image 200A in the panoramic image 200, if a command to change the viewpoint to a second viewpoint which is rotated by 90 degrees is input, the processor 120 may control the display 110 to display the second viewpoint image 200B corresponding to the second viewpoint. Accordingly, the viewpoint displayed on the display apparatus 100 is changed from the viewpoint of the first viewpoint image 200A to the second viewpoint of the second viewpoint image 200B.

Figure 5:
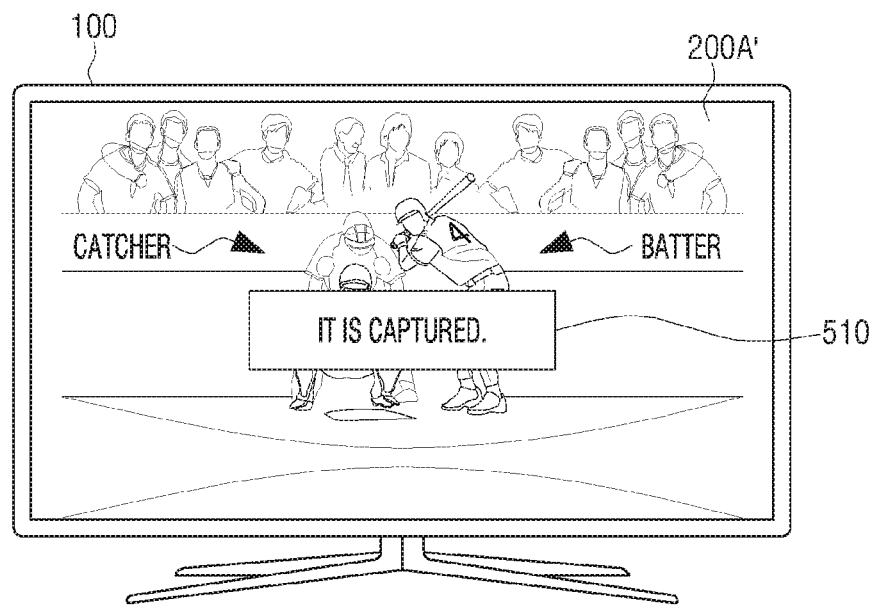
FIG. 5 is a view illustrating a display when a capture command is input according to an exemplary embodiment.

If a capture command is input while the display apparatus 100 displays the first viewpoint image 200A, the display apparatus 100 may display the screen as illustrated in FIG. 5. Specifically, the processor 120 may generate a capture image having a plurality of viewpoints corresponding to the user's capture command and, when the generation of the capture image is completed, the screen such as illustrated in FIG. 5 may be displayed.

FIG. 5 is a view illustrating a display example of a display when a capture command is input according to an exemplary embodiment.

Figure 7:
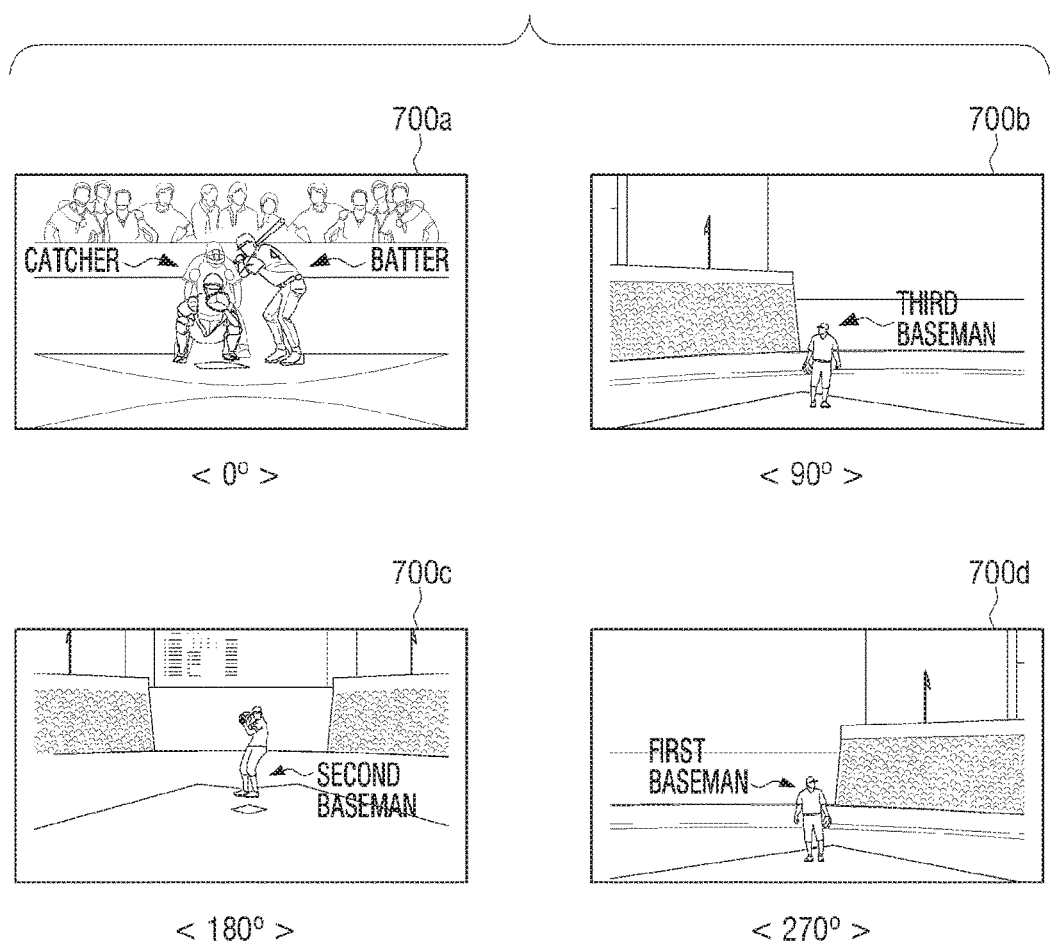
FIG. 7 is a view illustrating a capture image generated in a third capturing method according to an exemplary embodiment.

Referring to FIG. 5, because a capture command is input while the first viewpoint image 200A is displayed, the displayed screen 200A' includes the first viewpoint image 200A and a message 510 which indicates that a capture is performed. The generated capture image according thereto may be seen like what is illustrated in FIG. 6 or FIG. 7.

In the state that a viewpoint is changed to another viewpoint which is different from a first viewpoint, if a capture command is input, a message informing that a capture is performed on the currently displayed screen may be displayed. In addition, the generated capture image according thereto may have a viewpoint different from the viewpoints of the images illustrated in FIGS. 6 and 7.

FIG. 6 is a view illustrating an example of a capture image generated in a second capturing method. Specifically, an entire image of a current display frame of a panoramic image is generated as a single capture image by the second capturing method.

Referring to FIG. 6, the generated capture image is composed of a single image and a panoramic image having viewpoints of 360 degrees, as illustrated.

When such a capture image is formed as a panoramic image, the processor 120 may form the panoramic image based on a display viewpoint. For example, a panoramic image having the currently displayed viewpoint located at the center axis of the panoramic image may be formed. If another location which is not the central axis is used as a basic display area when the panoramic image is displayed, the processor 120 may form a panoramic image which displays an image at the time of capturing the panoramic image.

A capture image which is identical to the image of the current display frame of the panoramic image may be generated and information regarding a basic display viewpoint may be added to the metadata of the generated capture image.

As such, because the current display viewpoint is reflected in generating a capture image having a plurality of viewpoints, a user may first check the display which is the most impressed to him/her in the capture image.

FIG. 7 is a view illustrating an example of a capture image generated in a third capturing method. Specifically, the third capturing method is an example of generating four capture images of which viewpoints are rotated by 0 degrees, 90 degrees, 180 degrees and 270 degrees with respect to a first viewpoint which is currently displayed corresponding to a capture command.

Referring to FIG. 7, the generated capture images four images of which viewpoints are respectively rotated by 0 degrees 600A, 90 degrees 600B, 180 degrees 600C and 270 degrees 600D with respect to the currently displayed viewpoint.

If the current viewpoint is a 30 degrees viewpoint, the captured four images may be capture images of which viewpoints are rotated by 30 degrees, 120 degrees, 210 degrees and 300 degrees.

Even though generating four capture images having four viewpoints is illustrated and described hereinabove, exemplary embodiments are not limited thereto, and two capture images of two viewpoints may be generated or five or more than five capture images may be generated. Specifically, when the third capturing method is selected, the processor 120 may control the display 110 to display a UI for receiving a selection of a plurality of viewpoints which images are to be captured in. Corresponding to the selection, the number of capture images to be generated and viewpoints of each of the capture images may be selected. Corresponding to such a user selection, the processor 120 may generate a plurality of capture images corresponding to the selected viewpoints.

Meanwhile, when the plurality of capture images are generated, the processor 120 may control the display 110 to display the captured images and receive a selection of an image which is to be stored among the captured images. The processor 120 may store only the selected capture image in the storage 130.

In the exemplary embodiment, because a plurality of capture images having different viewpoints are generated, when the captured images are displayed, the processor 120 may generate a panoramic image by merging the plurality of capture images and may display a viewpoint of the generated panoramic image.

Even though it is described that capture images are generated only when a capture command is input, exemplary embodiments are not limited thereto, and capture images may be generated automatically. In addition, even though only generating capture images having a plurality of viewpoints with respect to a photographing point on a ground to take a panoramic image is described, exemplary embodiments are not limited thereto, and capture images having a plurality of viewpoints with respect to another photographing point on the ground may be generated.

The exemplary embodiment as described above will be described below with reference to FIGS. 8 and 9.

Figure 8:
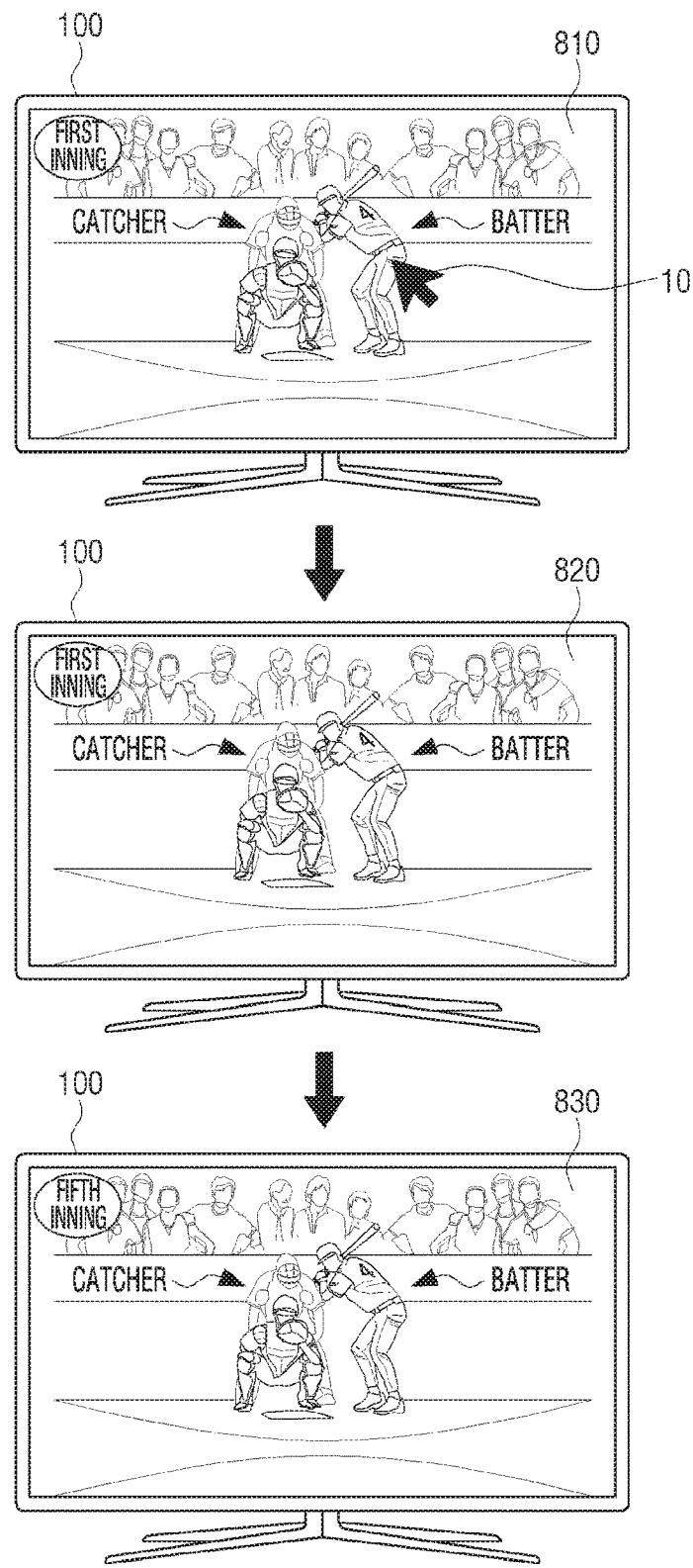
FIG. 8 is a view illustrating a capture image generated based on an object according to an exemplary embodiment.

FIG. 8 is a view illustrating an example of generating a capture image based on an object. Specifically, FIG. 8 illustrates that a certain object is selected and a capture is automatically performed when the certain object is detected.

Referring to FIG. 8, the user may select certain coordinates on a screen 810 of the display apparatus 100. Corresponding to the selection, the processor 120 may analyze an object which is currently displayed on the selected coordinates.

In the process of displaying an image, when the identical object is detected again, a plurality of capture images having a plurality of viewpoints may be generated without a separate command. For example, in response to a user input selecting a certain batter while watching a baseball game as shown in the screen 810 in FIG. 8, a capture image 820 may be generated at the time of the selection and another capture image 830 may be generated at a subsequent time when the batter is subsequently detected.

Meanwhile, the identical object may appear continuously in multiple frames over a period of time. In this case, all frames in which the identical object is present may be captured as capture images. According to aspects of one or more exemplary embodiments, a capture image may be generated at predetermined time intervals in a section the identical object is continuously present, or only a first frame in which the identical object is present in the section that the object is continuously present may be generated.

Even though it is described that a plurality of capture images are generated corresponding to an object selection with respect to flow of time, exemplary embodiments are not limited thereto, and a plurality of capture images may be generated corresponding to an object selection with respect to space.

With respect to the selected object, a first capture image in which the selected object is located at the center, a second capture image in which the selected object is located on the right side and a third capture image in which the selected object is located on the left side may be generated.

Specifically, the processor 120 may identify the object corresponding to the selected coordinates and generate a plurality of capture images in which the identified objects are disposed in various compositions. Herein, the processor 120 may identify another object which is located at another area rather than the selected coordinates and generate a plurality of capture images in which the selected object and the additionally identified another object are placed in various compositions.

Figure 9:
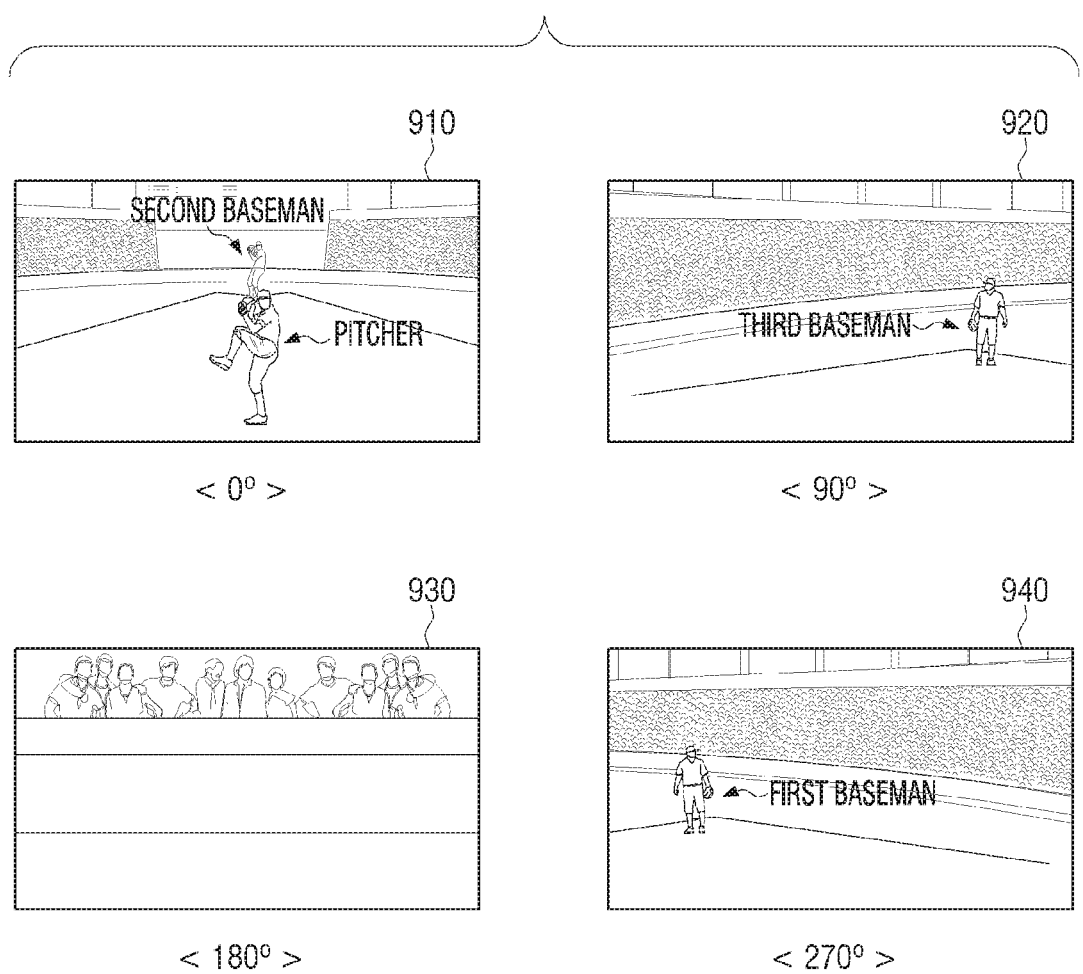
FIG. 9 is a view illustrating capture images generated in a fourth capturing method according to an exemplary embodiment.

FIG. 9 is a view illustrating an example of capture images generated in a fourth capturing method. Specifically, the fourth capturing method may be used in the case that the display apparatus 100 operates game contents, that is, the case that the rendered image corresponding to the selected viewpoint is displayed.

Referring to FIGS. 8 and 9, when a user inputs a capture command by selecting a certain object while using a game content, the processor 120 may render a panoramic image having viewpoints of 360 degrees with respect to the selected object and generate capture images having a plurality of viewpoints with respect to the rendered panoramic image having viewpoints of 360 degrees.

Meanwhile, the processor 120 may generate a plurality of capture images 910, 920, 930, 940 of which viewpoints are rotated by 0 degrees (910), 90 degrees (920), 180 degrees (930) and 270 degrees (940) with respect to the selected object (for example, a batter).

Figure 10:
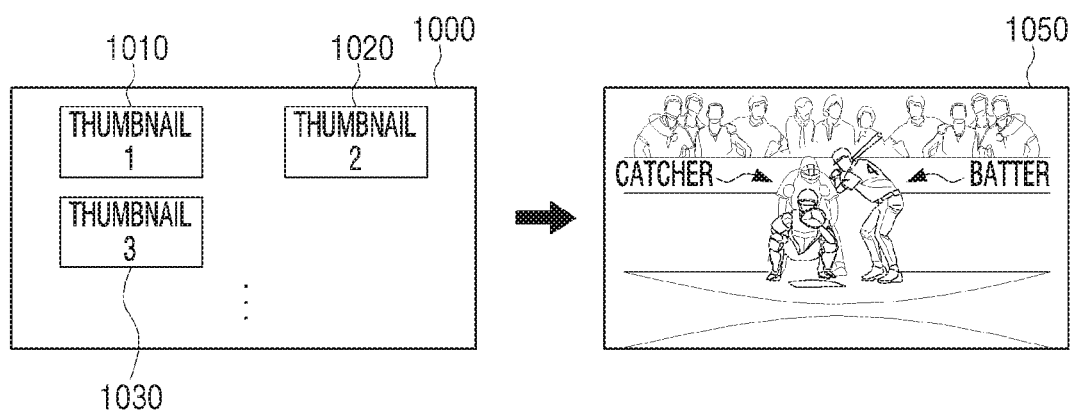
FIG. 10 is a view illustrating displaying a capture image according to an exemplary embodiment.

FIG. 10 is a view illustrating an operation for displaying a capture image according to an exemplary embodiment.

When a command to display a capture image is input, the processor 120 may display a first screen 1000 including thumbnails respectively corresponding to a plurality of capture images stored in the storage 130.

If the user selects a first capture image 1010 having a plurality of viewpoints on the first screen 1000, the processor 120 may control the display 110 to display the selected first capture image 1010. Herein, the processor 120 may control the display 110 to display a screen corresponding to a viewpoint at the time of the capture being performed. For this, the processor 120 may check viewpoint information by using metadata in the first capture image 1010 and display an image corresponding to the checked viewpoint information, in the capture image.

If there is no separate viewpoint information in the metadata, a default area in the panoramic image may be preferentially displayed. In response to an input of a command to move a viewpoint, the processor 120 may control the display 110 to display an area of the viewpoint corresponding to the command to move the viewpoint.

Figure 11:
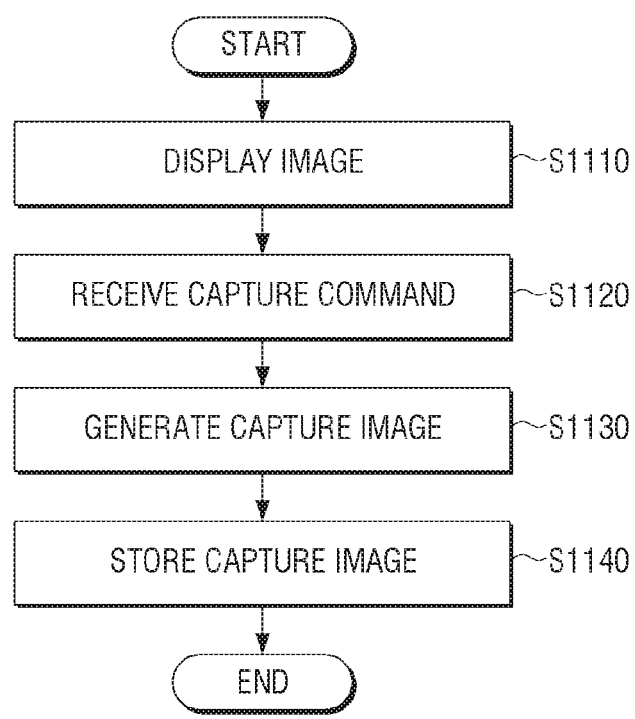
FIG. 11 is a flowchart illustrating a method for generating a capture image according to an exemplary embodiment.

FIG. 11 is a flowchart illustrating a method for generating a capture image according to an exemplary embodiment.

Referring to FIG. 11, an image corresponding to a first viewpoint in a panoramic image is displayed in operation S1110. Herein, in response to a command to change a viewpoint being input, an image corresponding to the viewpoint according to the input command to change the viewpoint may be displayed.

A capture command is received in operation S1120. Specifically, the capture command can be input through a button which is equipped with the display apparatus (or an external apparatus) or a remote controller. The display apparatus 100 may display a UI for receiving a selection of a capturing method and receive a selection of a capturing method. Herein, the capturing method may be a method of capturing a currently displayed screen, which is the existing capturing method, a method of generating a single capture image having a plurality of viewpoints, a method of generating a plurality of capture images having different viewpoints, etc.

A capture image having a plurality of viewpoints is generated by using a current display frame of a panoramic image in operation S1130. Specifically, a capture image corresponding to the previously selected capturing method may be generated. For example, if a method of generating a single capture image having a plurality of viewpoints is selected, the entire image of the current display frame of the panoramic image can be generated in a single capture image as illustrated in FIG. 6.

If a method of generating a plurality of capture images having different viewpoints is selected, four capture images of which viewpoints are rotated by 0 degrees, 90 degrees, 180 degrees and 270 degrees with respect to the first viewpoint which is currently displayed as illustrated in FIG. 7 may be generated.

The generated capture images are stored in operation S1140. Specifically, the generated capture images may be stored in the storage 130 in the display device 100 or the generated capture image may be stored in an external storage by being transmitted to an external server (or a cloud server) through the communication interface.

Therefore, because the capture image generating method is generating capture images having a plurality of viewpoints at the time of capturing a panoramic image, a user may capture a plurality of images without changing viewpoints on the screen, and thus, user convenience is improved. In addition, the display device may display any image among the images corresponding to all viewpoints of 360 degrees in the panoramic image. The capture image generation method as illustrated in FIG. 11 may be performed by the display apparatus having the configuration as illustrated in FIG. 1 or FIG. 2 or by any display apparatus having a different configuration.

Methods of generating a capture image according to various exemplary embodiments may be stored on a non-transitory readable medium. The non-transitory readable medium may be installed and used in various types of apparatuses.

According to an exemplary embodiment, the non-transitory computer readable medium refers to a medium which may store data semi-permanently rather than storing data for a short time, and may, for example, be implemented as a register, a cache or a memory, and may be readable by an apparatus. Specifically, programs of performing the above-described various methods can be stored in the non-transitory computer readable medium such as a CD, a DVD, a hard disk, a Blu-ray disk, universal serial bus (USB), a memory card, ROM, or the like, and can be provided.

While exemplary embodiments have been shown and described, it will be understood by those skilled in the art that various changes in form and detail may be made therein without departing from the spirit and principles of the present disclosure, the scope of which is defined by the appended claims and their equivalents.

What is claimed is:

1. A display device, comprising:
 a display configured to display an image corresponding to a currently displayed viewpoint of a plurality of viewpoints in a panoramic image;
 a processor configured to capture an image having a plurality of image viewpoints including the currently displayed viewpoint and at least one viewpoint that is not displayed currently on the display, corresponding to a current display frame of the panoramic image in response to receiving a capture command; and
 a storage configured to store the captured image,
 wherein the plurality of image viewpoints correspond to a plurality of partial areas in the panoramic image, respectively.

2. The display device as claimed in claim 1, wherein the processor is further configured to include each of the plurality of viewpoints of the current display frame of the panoramic image in a single image.

3. The display device as claimed in claim 2, wherein the processor is further configured to generate the single image based on the currently displayed viewpoint.

4. The display device as claimed in claim 2, wherein the processor is further configured to generate information regarding the currently displayed viewpoint as metadata and associate the metadata with the single image.

5. The display device as claimed in claim 1, wherein the captured image is one of a plurality of images, and
 wherein the processor is further configured to generate the plurality of images respectively corresponding to the plurality of viewpoints of the current display frame of the panoramic image.

6. The display device as claimed in claim 5, wherein the plurality of images comprises a first image having a first image viewpoint rotated by 0 degrees with respect to the currently displayed viewpoint, a second image having a second image viewpoint rotated by 90 degrees with respect to the currently displayed viewpoint, a third image having a third image viewpoint rotated by 180 degrees with respect to the currently displayed viewpoint and a fourth image having a fourth image viewpoint rotated by 270 degrees with respect to the currently displayed viewpoint.

7. The display device as claimed in claim 1, further comprising a manipulator configured to receive the capture command and a selection of an object in the panoramic image.

8. The display device as claimed in claim 7, wherein the processor is further configured to detect whether the selected object is currently displayed, and to repeatedly capture images in response to the selected object being detected while the panoramic image is reproduced.

9. The display device as claimed in claim 7, wherein the processor is further configured to capture the image having the plurality of viewpoints based on the selected object.

10. The display device as claimed in claim 1, wherein the processor is further configured to control the display to display an area of a pre-stored image corresponding to a previously displayed viewpoint of the panoramic image corresponding to a time the capture command was received in response to receiving a display command with respect to the pre-stored image corresponding to the previously displayed viewpoint.

11. The display device as claimed in claim 1, wherein the panoramic image comprises viewpoints of 360 degrees.

12. A method for capturing an image, the method comprising:
 displaying an image corresponding to a currently displayed viewpoint of a plurality of viewpoints in a panoramic image;
 receiving a capture command;
 capturing the image having a plurality of image viewpoints including the currently displayed viewpoint and at least one viewpoint that is not displayed currently on a display, corresponding to a current display frame of the panoramic image; and
 storing the captured image,
 wherein the plurality of image viewpoints correspond to a plurality of partial areas in the panoramic image, respectively.

13. The method as claimed in claim 12, wherein the generating comprises including each of the plurality of viewpoints of the current display frame of the panoramic image in a single image.

14. The method as claimed in claim 13, wherein the generating is based on the currently displayed viewpoint.

15. The method as claimed in claim 13, wherein the generating comprises:
 generating information regarding the currently displayed viewpoint as metadata; and
 associating the metadata with the single image.

16. The method as claimed in claim 12, wherein the captured image is one of a plurality of images, and
 the generating comprises generating the plurality of images respectively corresponding to the plurality of viewpoints of the current display frame of the panoramic image.

17. The method as claimed in claim 16, wherein the plurality of images comprises a first image having a first image viewpoint rotated by 0 degrees with respect to the currently displayed viewpoint, a second image having a second image viewpoint rotated by 90 degrees with respect to the currently displayed viewpoint, a third image having a third image viewpoint rotated by 180 degrees with respect to the currently displayed viewpoint and a fourth image having a fourth image viewpoint rotated by 270 degrees with respect to the currently displayed viewpoint.

18. The method as claimed in claim 12, further comprising receiving a selection of an object in the panoramic image,
   wherein the generating comprises:
      detecting whether the selected object is currently displayed; and
      repeatedly generating images, in response to the selected object being detected while the panoramic image is reproduced.

19. The method as claimed in claim 12, further comprising receiving a selection of an object in the panoramic image,
   wherein the capturing comprises capturing image having the plurality of viewpoints is based on the selected object.

20. A non-transitory computer readable recording medium including a program, which when executed by a processor a display device, causes the display device to execute a method of capturing an image, the method including:
   displaying an image corresponding to a currently displayed viewpoint of a plurality of viewpoints in a panoramic image;
   receiving a capture command;
   capturing the image having a plurality of image viewpoints including the currently displayed viewpoint and at least one viewpoint that is not displayed currently on a display, corresponding to a current display frame of the panoramic image; and
   storing the captured image,
   wherein the plurality of image viewpoints correspond to a plurality of partial areas in the panoramic image, respectively.

21. A device configured to capture an image, the device comprising:
   a display configured to display an image corresponding to a currently displayed viewpoint of a plurality of viewpoints in a panoramic image; and
   a processor configured to determine an image operating mode and capture an image having a plurality of image viewpoint including the currently displayed viewpoint and at least one viewpoint that is not displayed currently on the display, based on a current display frame of the panoramic image in response to receiving a capture command,
   wherein the plurality of image viewpoints correspond to a plurality of partial areas in the panoramic image, respectively.

22. The device as claimed in claim 21, wherein the image operating mode is selected from among a first image operating mode, a second image operating mode and a third image operating mode, and
   wherein the processor is further configured to capture only the currently displayed viewpoint as the captured image while operating in the first image operating mode, capture each of the plurality of viewpoints as the captured image while operating in the second image operating mode, and capture a first viewpoint of the plurality of viewpoints and a second viewpoint of the plurality of viewpoints as the captured image while operating in the third image operating mode.

23. The device as claimed in claim 22, wherein the processor is further configured to control the display to indicate one among the first image operating mode, the second image operating mode and the third image operating mode a current operating mode.

24. The device as claimed in claim 22, wherein the panoramic image is one of a plurality of sequentially displayed panoramic images, and
   the processor is further configured to receive an object selection indicating a selected object, determine whether the selected object is displayed in a currently displayed panoramic image of the plurality of sequentially displayed panoramic images, and generate e-et trp an image for each panoramic image of the plurality of sequentially displayed panoramic images determined to include the selected object.

* * * * *